(12) United States Patent
Li

(10) Patent No.: US 10,960,798 B1
(45) Date of Patent: Mar. 30, 2021

(54) PROTECTOR FOR REAR SEAT OF VEHICLE

(71) Applicant: XU CHANG HAI YE TRADING LIMITED, Xuchang (CN)

(72) Inventor: Lin Li, Xuchang (CN)

(73) Assignee: XU CHANG HAI YE TRADING LIMITED, Xuchang (CN)

( * ) Notice: Subject to any disclaimer, the term of this patent is extended or adjusted under 35 U.S.C. 154(b) by 0 days.

(21) Appl. No.: 16/656,591

(22) Filed: Oct. 18, 2019

(30) Foreign Application Priority Data

Sep. 10, 2019 (CN) .......................... 201910853326.1

(51) Int. Cl.
*B60N 2/60* (2006.01)

(52) U.S. Cl.
CPC .................................. *B60N 2/6027* (2013.01)

(58) Field of Classification Search
CPC .................................................... B60N 2/6027
USPC ............................................ 297/228.12, 229
See application file for complete search history.

(56) References Cited

U.S. PATENT DOCUMENTS

| | | | | |
|---|---|---|---|---|
| 2,027,947 A * | 1/1936 | Wittcoff | ................. | A47C 7/425 297/228.12 X |
| 4,512,286 A * | 4/1985 | Rux | ..................... | A01K 1/0272 119/771 |
| 4,924,814 A * | 5/1990 | Beaudet | ............... | A01K 1/0272 119/712 |
| 4,943,105 A * | 7/1990 | Kacar | .................. | A01K 1/0272 297/229 X |
| 5,215,345 A * | 6/1993 | Orphan | ................ | B60N 2/3013 296/37.16 |
| 5,294,166 A * | 3/1994 | Shapland | ............. | B60N 2/6009 297/229 X |
| 5,322,335 A * | 6/1994 | Niemi | .................. | B60N 2/6009 296/39.1 |
| 5,487,361 A * | 1/1996 | Dean | .................... | A01K 1/0272 119/28.5 |
| 6,676,209 B1 * | 1/2004 | Szabo | ...................... | B60N 2/60 297/229 X |
| 7,261,375 B2 * | 8/2007 | Godshaw | ............. | A01K 1/0272 297/228.12 X |
| 7,287,813 B2 * | 10/2007 | Aliev | ..................... | B60R 11/00 297/229 X |
| 7,677,662 B2 * | 3/2010 | Thompson | ........... | B60N 2/6009 297/228.12 X |
| 9,610,877 B2 * | 4/2017 | Umlaut | ................. | B60R 13/011 |
| 9,669,742 B1 * | 6/2017 | Bailey | .................... | B60R 5/006 |

(Continued)

*Primary Examiner* — Rodney B White

(74) *Attorney, Agent, or Firm* — Hemisphere Law, PLLC; Zhigang Ma

(57) ABSTRACT

A protector for a rear seat of a vehicle includes a seat cushion and a back pad, wherein the back pad includes a left back pad and a right back pad, the left back pad and the right back pad are respectively provided with a first engaging portion and a second engaging portion, the left back pad and the right back pad are respectively oppositely provided with a first notch and a second notch, the first notch, the second notch and the corresponding partial edge of the seat cushion form a receiving hole, the receiving hole is matched with the vertical cross section of the open state of a central armrest, the protector further includes a cover portion that selectively opens or covers the receiving hole. The protector can provide more comprehensive protection for the rear seat of the vehicle.

14 Claims, 5 Drawing Sheets

(56) References Cited

U.S. PATENT DOCUMENTS

| | | | |
|---|---|---|---|
| 9,815,395 B2 * | 11/2017 | Umlaut | B60N 2/90 |
| 9,845,033 B1 * | 12/2017 | Umlauf | B60N 2/36 |
| 9,963,086 B2 * | 5/2018 | Umlauf | B60J 7/0007 |
| 10,081,278 B1 * | 9/2018 | Balzer | B60N 2/60 |
| 10,343,568 B2 * | 7/2019 | Umlauf | B60N 2/60 |
| 10,363,847 B2 * | 7/2019 | Umlauf | B60N 2/6027 |
| 10,406,951 B2 * | 9/2019 | Guerrero | B60N 2/6009 |
| 2005/0236874 A1 * | 10/2005 | Godshaw | A01K 1/0272 297/35 |
| 2012/0098308 A1 * | 4/2012 | Aliev | B60N 2/6018 297/219.1 |

* cited by examiner

PROTECTOR FOR REAR SEAT OF VEHICLE

FIELD OF THE DISCLOSURE

The invention relates to the technical field of a seat pad of a vehicle, in particular to a protector for a rear seat of a vehicle.

BACKGROUND OF THE DISCLOSURE

Nowadays, the protectors of the rear seat of the vehicle are separated into left and right sides, which are respectively laid in the left seat and the right seat, however, the position of the seat corresponding to the position of the central armrest is completely exposed to the outside, and it may be contaminated and damaged by external conditions, such as when carrying a child or a pet. There is also a protector for the rear seat of the vehicle which is left and right, the middle part of the pad corresponding to the central armrest is provided with a notch from the top of the back pad of the pad to the seat cushion, so that the central armrest can be opened and folded, however, after the central armrest is opened, the receiving hole for accommodating the central armrest will be completely exposed to the outside, and will be contaminated and destroyed by external conditions, when the central armrest is folded, the part of the central armrest corresponding to the back pad is also completely exposed to the outside, and will still be contaminated and destroyed by external conditions. There is also a protector for the rear seat of the vehicle which is left and right, and two vertical zippers are installed in the middle of the back pad, when the zipper is opened, it can be pulled from the upper edge of the back pad to the connection of the back pad and the seat cushion, when the central armrest is lowered, the zipper is fully opened, but the receiving hole for accommodating the central armrest is completely exposed to the outside and is subject to external conditions of contamination and damage.

SUMMARY OF THE DISCLOSURE

The object of the present invention is to provide a protector for a rear seat of a vehicle, which can provide more comprehensive protection for the rear seat of the vehicle and prevent contamination and damage of the seat.

In order to achieve the above object, the present invention provides a protector for a rear seat of a vehicle, and the protector for the rear seat of the vehicle includes a seat cushion and a back pad connecting the seat cushion, the back pad includes a left back pad and a right back pad provided on a same edge of the seat cushion, side edges adjacent to the left back pad and the right back pad are respectively provided with a first engaging portion and a second engaging portion, the first engaging portion and the second engaging portion are detachably connected, the first engaging portion and the second engaging portion are respectively located at ends of the left back pad and the right back pad away from the seat cushion, the side edges adjacent to the left back pad and the right back pad are respectively oppositely provided with a first notch and a second notch, the first notch is located at an end of the left back pad adjacent to the seat cushion, and the first notch extends from a connection between the left back pad and the seat cushion to the first engaging portion, the second notch is located at an end of the right back pad adjacent to the seat cushion, and the second notch extends from a connection between the right back pad and the seat cushion to the second engaging portion, the first notch, the second notch and a corresponding partial edge of the seat cushion form a receiving hole, the receiving hole is matched with a vertical cross section of an open state of a central armrest of the rear seat of the vehicle, the protector for the rear seat of the vehicle further includes a cover portion disposed at a connection between the seat cushion and the back pad, and the cover portion can selectively open or cover the receiving hole.

When the central armrest of the rear seat of the vehicle is opened and used by the above technical solution, the first engaging portion and the second engaging portion are separated first, the left back pad and the right back pad are separated, and the cover portion is opened to expose the receiving hole, then the central armrest is opened, and finally the first engaging portion and the second engaging portion are connected, and the left back pad and the right back pad still form a unitary structure to protect the portion for accommodating the central armrest; when the central armrest is folded, the first engaging portion and the second engaging portion are separated first, the left back pad and the right back pad are separated, and the central armrest is folded, and finally the first engaging portion and the second engaging portion are connected, and the cover portion covers the receiving hole. This provides a more comprehensive protection of the rear seat of the vehicle, preventing the seat from causing pollution and damage.

BRIEF DESCRIPTION OF THE DRAWINGS

In order to more clearly illustrate the embodiments of the present invention or the technical solutions in the prior art, the drawings used in the embodiments or the prior art description will be briefly described below. Obviously, the drawings in the following description are only some embodiments of the invention, it will be apparent to those skilled in the art that other drawings may be obtained in accordance with the structures illustrated in the drawings without departing from the scope of the invention.

DETAILED DESCRIPTION OF PREFERRED EMBODIMENTS

Figure 1:
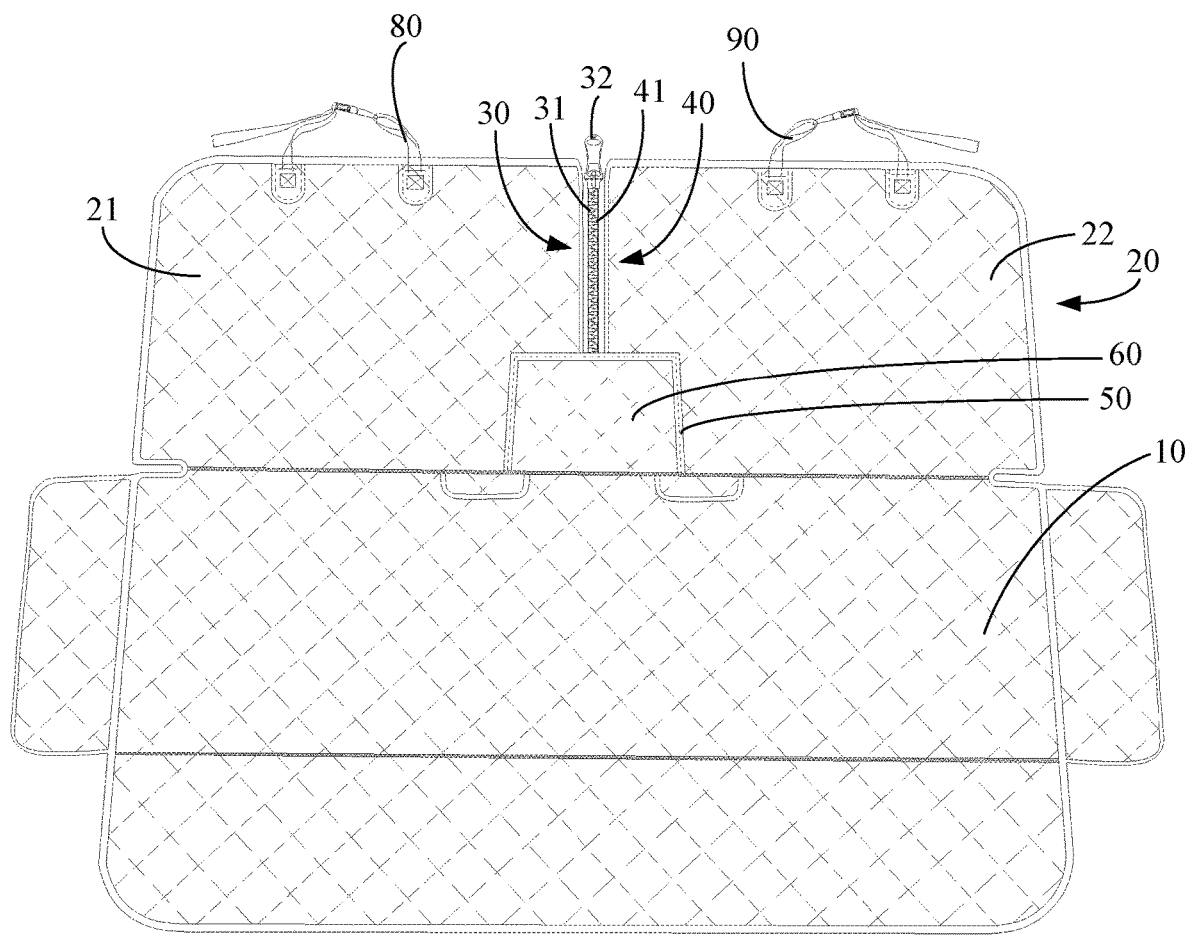
FIG. 1 is a schematic structural view of an embodiment of a protector for a rear seat of a vehicle according to the present invention.

The technical solutions in the embodiments of the present invention are clearly and completely described in the following with reference to the accompanying drawings in the embodiments of the present invention. It is apparent that the described embodiments are only a part of the embodiments of the invention, and not all of them. All other embodiments obtained by those skilled in the art based on the embodiments of the present invention without creative efforts are within the scope of the present invention.

It should be noted that all directional indications (such as up, down, left, right, front, back, . . . ) in the embodiments of the present invention are only used to explain the relative positional relationship, motion, etc. between components in a certain posture (as shown in the drawing). If the specific posture changes, the directional indication also changes accordingly.

In the present invention, the terms "connected", "fixed", etc., should be understood broadly, unless expressly stated and limited otherwise. For example, the "fixed" may be a fixed connection, a detachable connection, or an integral; may be a mechanical connection or an electrical connection; may be directly connected or indirectly connected through an intermediate medium, and may be an internal connection of two elements or an interaction of two elements unless explicitly defined otherwise. For those skilled in the art, the specific meanings of the above terms in the present invention can be understood on a case-by-case basis.

In addition, the descriptions of "first", "second", and the like in the present invention are used for the purpose of description only, and are not to be construed as indicating or implying their relative importance or implicitly indicating the number of technical features indicated. Thus, features defining "first" or "second" may include at least one of the features, either explicitly or implicitly. In addition, the technical solutions between the various embodiments may be combined with each other, but must be based on what can be implemented by those skilled in the art. When the combination of technical solutions is contradictory or unrealizable, it should be considered that the combination of such technical solutions does not exist and is not within the scope of protection required by the present invention.

The invention provides a protector for a rear seat of a vehicle.

Referring to FIG. 1, FIG. 2, FIG. 3, FIG. 5 and FIG. 6, in an embodiment of the present invention, the protector for the rear seat of the vehicle includes a seat cushion 10 and a back pad 20 connecting the seat cushion 10, the back pad 20 includes a left back pad 21 and a right back pad 22 provided on the same edge of the seat cushion 10, adjacent side edges of the left back pad 21 and the right back pad 22 are respectively provided with a first engaging portion 30 and a second engaging portion 40, the first engaging portion 30 and the second engaging portion 40 are detachably connected, the first engaging portion 30 and the second engaging portion 40 are respectively located at the ends of the left back pad 21 and the right back pad 22 away from the seat cushion 10, the adjacent side edges the left back pad 21 and the right back pad 22 further are respectively provided with a first notch 231 and a second notch 232, the first notch 231 is located at the end of the left back pad 21 adjacent to the seat cushion 10, and the first notch 231 in a lengthwise direction of the first engaging portion 30 extends from the connection between the left back pad 21 and the seat cushion 10 to the first engaging portion 30, the second notch 232 is located at the end of the right back pad 22 adjacent to the seat cushion 10, and the second notch 232 in the lengthwise direction of the first engaging portion 30 extends from the connection between the right back pad 22 and the seat cushion 10 to the second engaging portion 40, the first notch 231, the second notch 232 and the corresponding partial edge of the seat cushion 10 form a receiving hole 23, the receiving hole 23 is matched with the vertical cross section of the open state of a central armrest 100 of the rear seat of the vehicle, the protector for the rear seat of the vehicle further includes a cover portion 60 disposed at the connection between the seat cushion 10 and the back pad 20, and the cover portion 60 can selectively open or cover the receiving hole 23. In other words, as seen from FIGS. 1 and 2, the right side edge (i.e., one of the adjacent side edges) of the left back pad 21 at the end of the left back pad 21 adjacent to the seat cushion 10 is internally recessed in a direction facing away from the first engaging portion 30 to form the first notch 231, the left side edge (i.e., the other one of the adjacent side edges) of the right back pad 22 at the end of the right back pad 22 adjacent to the seat cushion 10 is internally recessed in a direction facing away from the second engaging portion 40 to form the second notch 232, the left back pad 21 and the right back pad 22 are detachably connected by the first engaging portion 30 and the second engaging portion 40, the first notch 231 and the second notch 232 are communicated with each other to form the receiving hole 23 when he first engaging portion 30 and the second engaging portion 40 are connected.

The seat cushion 10, the back pad 20 and the cover portion 60 are all made of textile materials. The inside of the seat cushion 10, the back pad 20 and the cover portion 60 may be provided with a sponge, latex, cotton or silk similar filler to improve the comfort of use. The seat cushion 10 and the back pad 20 may be connected by wire sewing. The cover portion 60 can be detachably connected to the edge of the first notch 23 and the edge of the second notch 232 by a snap, button, magnet or hook and loop fastener structure 50. The length of the receiving hole 23 may be greater than the length of the vertical cross section of the open state of the central armrest 100 of the rear seat of the vehicle by 3 mm to 10 mm. The height of the receiving hole 23 may be greater than the height of the vertical cross section of the open state of the central armrest 100 of the rear seat of the vehicle by 3 mm to 10 mm.

When the central armrest 100 of the rear seat of the vehicle is opened and used by the above technical solution, the first engaging portion 30 and the second engaging portion 40 are separated first, the left back pad 21 and the right back pad 22 are separated, the cover portion 60 is opened to expose the receiving hole 23, then the central armrest 100 is opened, and finally the first engaging portion 30 and the second engaging portion 40 are connected, and the left back pad 21 and the right back pad 22 still form a unitary structure to protect the portion for accommodating the central armrest 100; when the central armrest 100 is folded, the first engaging portion 30 and the second engaging portion 40 are separated first, the left back pad 21 and the right back pad 22 are separated, and the central armrest 100 is folded, and finally the first engaging portion 30 and the second engaging portion 40 are connected, and the cover portion 60 covers the receiving hole 23. This provides a more comprehensive protection of the rear seat of the vehicle, preventing the seat from causing pollution and damage.

Figure 3:
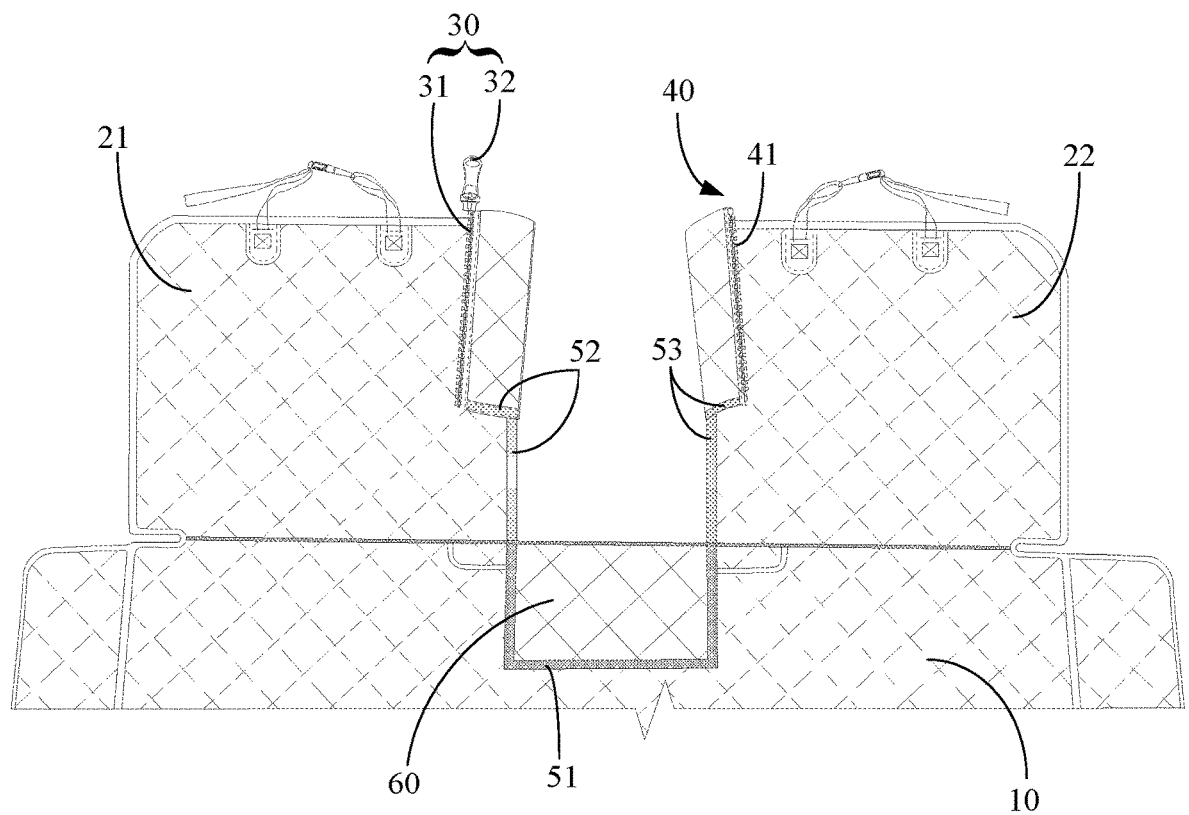
FIG. 3 is a structural schematic view showing the state in which the cover portion of the protector for the rear seat of the vehicle of FIG. 1 is opened, and the first engaging portion and the second engaging portion are separated.

Referring to FIG. 3, preferably, in one embodiment, the cover portion 60 is detachably connected to the edge of the first notch 231 and the edge of the second notch 232 through the hook and loop fastener structure 50. Specifically, the hook and loop fastener structure 50 includes a loop surface 51 disposed on the edge of the cover portion 60, a first hook surface 52 disposed on the edge of the first notch 231, and a second hook surface 53 disposed on the edge of the second notch 232. When the cover portion 60 is covered by the receiving hole 23, the loop surface 51 is simultaneously bonded to the first hook surface 52 and the second hook surface 53. The loop surface 51 can be sewn to the edge of the cover portion 60 by a wire. The first hook surface 52 can be sewn to the edge of the first notch 231 by a wire, and the second hook surface 53 can be sewn to the edge of the second notch 232 by a wire. It is more convenient and quick to open and close the cover portion 60. Further, the first hook surface 52 completely covers the edge of the first notch 231, and the second hook surface 53 completely covers the edge of the second notch 232. The loop surface 51 corresponds to the first hook surface 52 and the second hook surface 53, the length of the loop surface 51 is greater than the length of the first hook surface 52 and the second hook surface 53, and the area of the loop surface 51 is greater than the area sum of the first hook surface 52 and the second hook surface 53, when the cover portion 60 is closed to the receiving hole 23, the loop surface 51 is closely connected to the first hook surface 52 and the second hook surface 53, and the cover portion 60 and the receiving hole 23 are tightly connected, the gap between the receiving hole 23 and the cover portion 60 is prevented, and the rear seat of the vehicle is further protected to prevent contamination and damage of the seat.

Preferably, the first engaging portion 30 includes a first chain teeth 31 arranged in the left back pad 21 and a slider 32 clamped on the first chain teeth 31. The second engaging portion 40 includes a second chain teeth 41 arranged in the right back pad 22, and the first chain teeth 31 and the second chain teeth 41 are staggered with each other. The slider 32 selectively clamps and moves the second chain teeth 41 to cause the first chain teeth 31 and the second chain teeth 41 to mesh or disengage. The first chain teeth 31, the second chain teeth 41 and the slider 32 constitute a zipper structure, and the left back pad 21 and the right back pad 22 can be separated by the zipper structure, which is more convenient and quick. When the left back pad 21 and the right back pad 22 are joined together by the first chain teeth 31 and the second chain teeth 41, the connection between the left back pad 21 and the right back pad 22 is tighter, preventing a gap between the two to prevent external pollution and damage, and further enhancing the more comprehensive protection of the rear seat of the vehicle.

Preferably, the first hook surface 52 extends from the edge of the first notch 231 near the connection of the left back pad 21 and the seat cushion 10 to the edge of the first notch 231 near the first chain teeth 31, the second hook surface 53 extends from the edge of the connection of the right back pad 22 and the cushion 10 by the second notch 232 to the edge of the second notch 232 near the second chain teeth 41. The loop surface 51 extends from the outer edge of the cover portion 60 by the end of the cover portion 60 near the left back pad 21 to the end of the cover portion 60 near the right back pad 22. Therefore, when the central armrest 100 is in the folded state, the cover portion 60 covers the receiving hole 23, and the left back pad 21, the right back pad 22 and the cover portion 60 are tightly connected, and there is no gap; when the central armrest 100 is in an open state, the left back pad 21 and the right back pad 22 are connected without a gap. The central armrest 100 can be in close contact with the edges of the first notch 231 and the second notch 232 or only have a gap of 3 mm to 10 mm, thereby blocking external pollution and damage, and further enhancing the more comprehensive protection of the rear seat of the vehicle.

Figure 2:
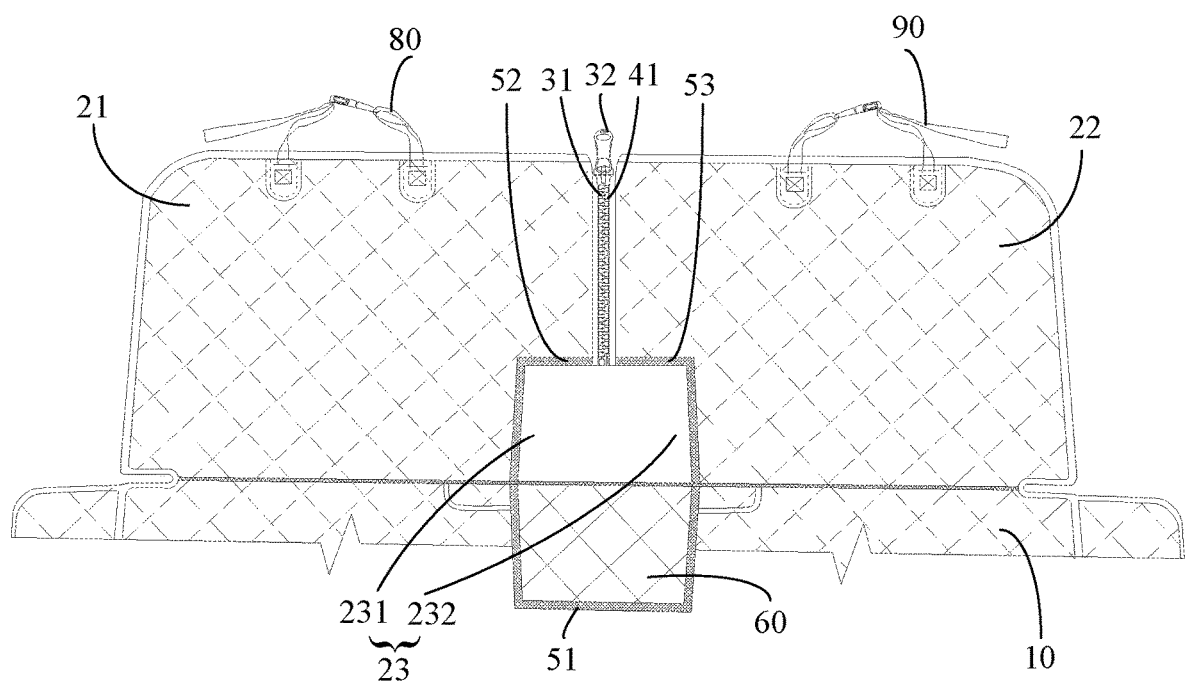
FIG. 2 is a structural schematic view showing the open state of the cover portion of the protector for the rear seat of the vehicle of FIG. 1.

Referring to FIG. 2, preferably, one end of the first hook surface 52 adjacent to the first chain teeth 31 is horizontally disposed, one end of the second hook surface 53 adjacent to the second chain teeth 41 is horizontally disposed, and the loop surface 51 is disposed at a horizontal line of the edge of the cover portion 60 away from the back pad 20 and the seat cushion 10, the loop surface 51 is detachably connected to the cover portion 60, when the loop surface 51 and the cover portion 60 are detached, the loop surface 51 provided in the horizontal straight line is simultaneously bonded to the first hook surface 52 and the second hook surface 53. The loop surface 51 and the cover portion 60 are connected to each other by a snap button, a button or a magnet, so that the loop surface 51 is detachable. And through the one end of the first hook surface 52 adjacent to the first chain teeth 31 is horizontally disposed, one end of the second hook surface 53 adjacent to the second chain teeth 41 is horizontally disposed, and the loop surface 51 is disposed at a horizontal line of the edge of the cover portion 60 away from the back pad 20 and the seat cushion 10, after the loop surface 51 and the cover portion 60 are detached and bonded to the first hook surface 52 and the second hook surface 53, the first hook surface 52 and the second hook surface 53 can be connected, the detachment of the first chain teeth 31 and the second chain teeth 41 from the end adjacent to the first hook surface 52 and the end of the second hook surface 53 can enhance the stability of the connection between the first chain teeth 31 and the second chain teeth 41, and by bonding the loop surface 51 to the first hook surface 52 and the second hook surface 53, the first hook surface 52 and the second hook surface 53 can be prevented from causing scratches or clothes hanging on the person who uses the seat cushion of the rear seat of the vehicle. It can also prevent the loop surface 51 from sticking to the pollution and affect its bonding performance to improve the service life.

Figure 4:
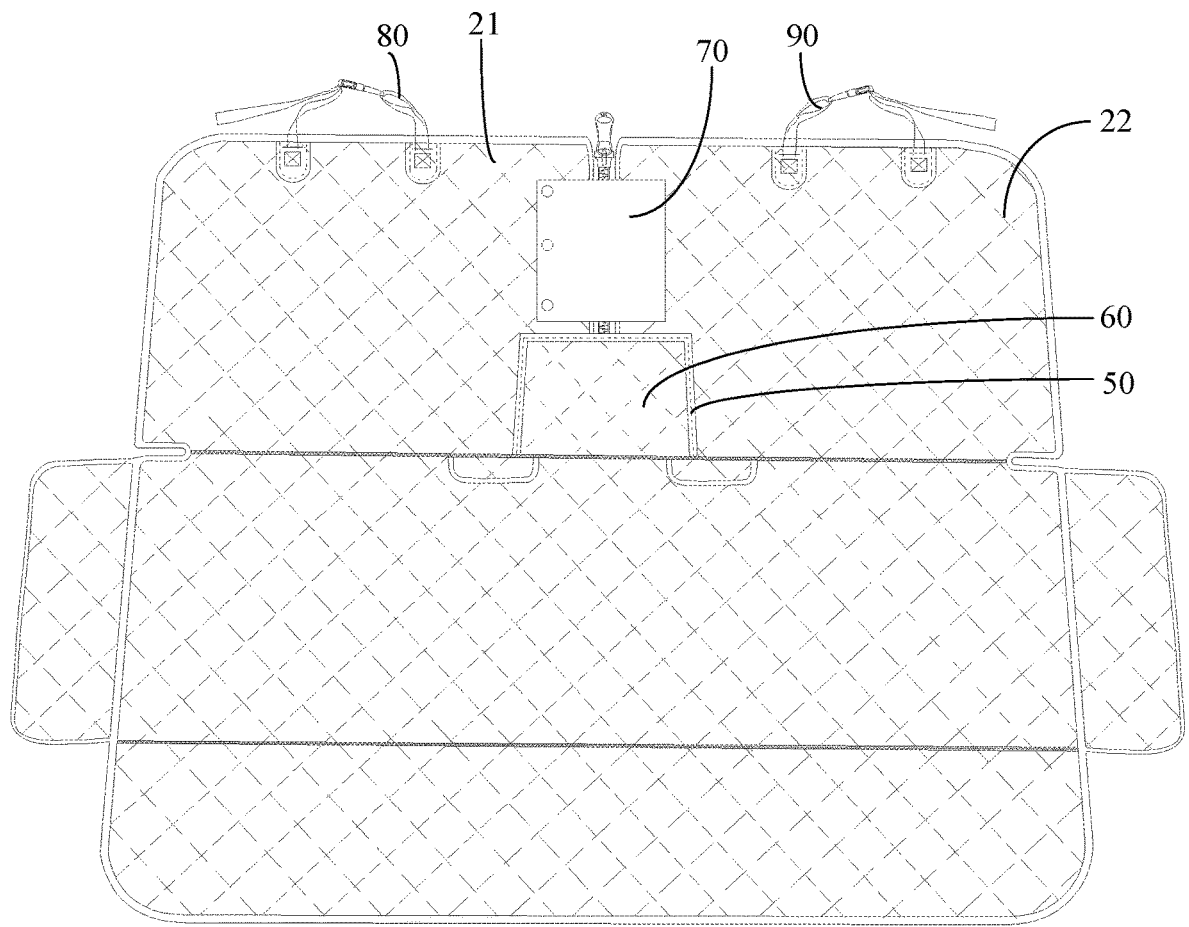
FIG. 4 is a structural schematic view showing the connecting portion of the protector for the rear seat of the vehicle of FIG. 1.

Referring to FIG. 4, further, the pad further includes a connecting portion 70, the end of the left back pad 21 adjacent to the first chain teeth 31 and the end of the right back pad 22 adjacent to the second chain teeth 41 are selectively connected to the end of the connecting portion 70, and the other end is detachably connected to another end of the connecting portion 70. The connecting portion 70 may be a textile material, and the connecting portion 70 may extend from one end of the first chain teeth 31 or the second chain teeth 41 to the other end. Therefore, the first chain teeth 31 and the second chain teeth 41 can be protected by the connecting portion 70, so that the first chain teeth 31 and the second chain teeth 40 are not easily separated by the pulling force of the external force, thereby making it more stable. Moreover, the connecting portion 70 can also cover the inevitable fine gap between the first chain teeth 31 and the second chain teeth 41 to block external pollution and damage, and further enhance the more comprehensive protection of the rear seat of the vehicle.

Figure 5:
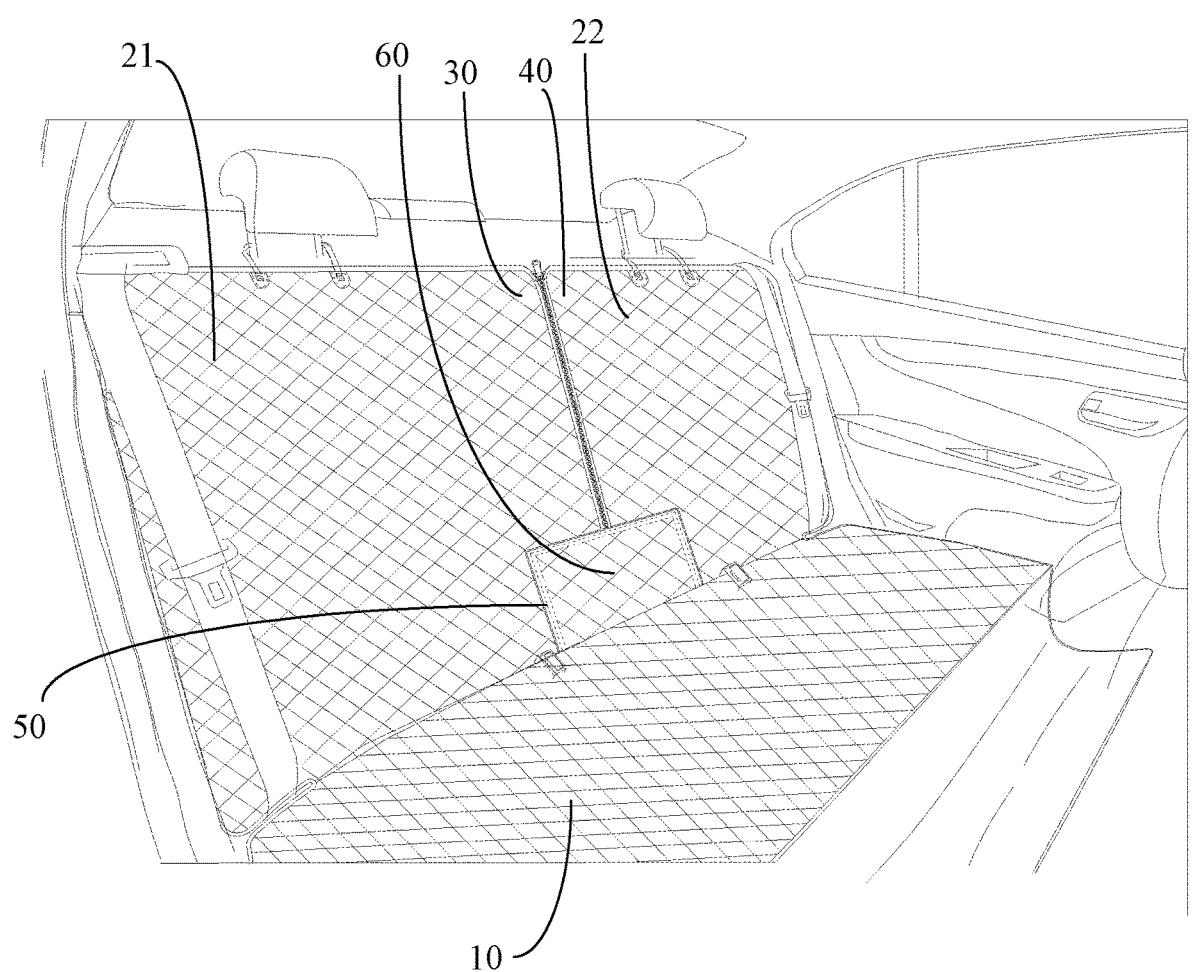
FIG. 5 is a schematic view of the back seat of the rear seat of the vehicle of FIG. 1 applied to the rear seat, and the central armrest of the rear seat of the vehicle is folded.
Figure 6:
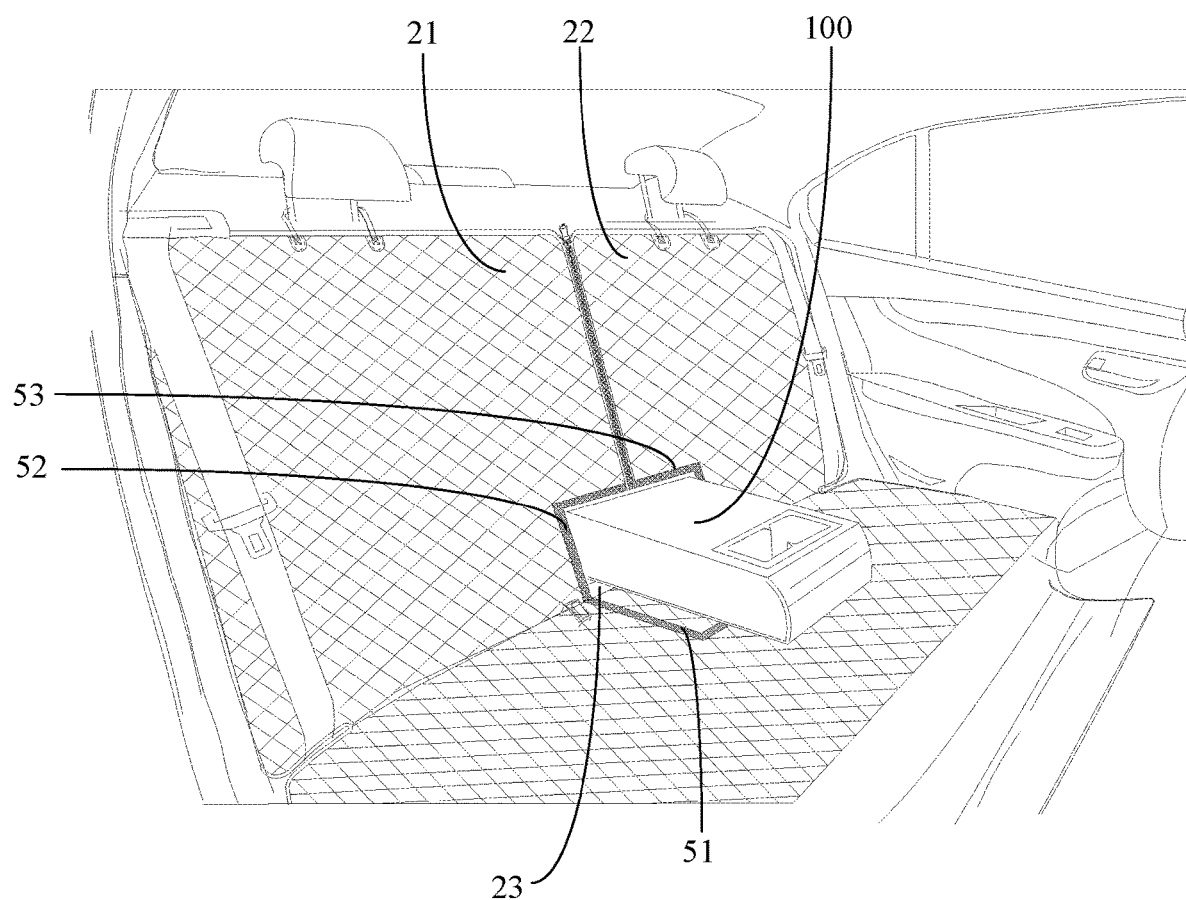
FIG. 6 is a schematic view showing the protector for the rear seat of the vehicle of FIG. 1 applied to the rear seat, and the central armrest of the rear seat of the vehicle is opened.

Referring to FIGS. 1, 5 and 6, preferably, the pad further includes a first tether 80 and a second tether 90, the first tether 80 is disposed at the end of the left back pad 21 away from the seat cushion 10, and the second tether 90 is disposed at the end of the right back pad 22 away from the seat cushion 10. The first tether 80 and the second tether 90 are used for connecting with the head of the seat of the rear seat of the vehicle, so that the protector for the rear seat of the vehicle and the seat of the rear seat are more convenient and quick to install and disassemble. And by adjusting the tightness of the first tether 80 and the second tether 90 to the seat connection, the left back pad 21 and the right back pad 22 may have a partial left and right offset when used to reduce the pulling of the first chain teeth 31 and the second chain teeth 41. The first chain teeth 31 and the second chain teeth 41 are prevented from being detached, making their use more stable.

The above description is only a preferred embodiment of the present invention, and thus does not limit the scope of the patent of the present invention. The equivalent structural transformations made by the present invention and the contents of the drawings, or direct/indirect use, are all included in the scope of patent protection of the present invention.

What is claimed is:

1. A protector for a rear seat of a vehicle, comprising a seat cushion and a back pad connected to the seat cushion, wherein the back pad comprises a left back pad and a right back pad provided on a same edge of the seat cushion, the left back pad has a first side edge, and the right back pad has a second side edge adjacent to the first side edge;

wherein the first side edge at an end of the left back pad away from the seat cushion is provided with a first engaging portion, the first side edge at another end of the left back pad adjacent to the seat cushion is internally recessed in a direction facing away from the first engaging portion to form a first notch, and the first notch in a lengthwise direction of the first engaging portion extends from a connection between the left back pad and the seat cushion to the first engaging portion;

wherein the second side edge at an end of the right back pad away from the seat cushion is provided with a second engaging portion, and the second side edge at another end of the right back pad adjacent to the seat cushion is internally recessed in a direction facing away from the second engaging portion to form a second notch, and the second notch in the lengthwise direction of the first engaging portion extends from a connection between the right back pad and the seat cushion to the second engaging portion;

wherein the left back pad and the right back pad are detachably connected by the first engaging portion and the second engaging portion, the first notch and the second notch are communicated with each other to form a receiving hole when the first engaging portion and the second engaging portion are connected, the receiving hole is matched with a vertical cross section of an open state of a central armrest of the rear seat of the vehicle, the protector for the rear seat of the vehicle further comprises a cover portion disposed at a connection between the seat cushion and the back pad, and the cover portion is configured to selectively open or cover the receiving hole;

wherein the first engaging portion comprises first chain teeth arranged on the left back pad and a slider clamped on the first chain teeth, the second engaging portion comprises second chain teeth arranged on the right back pad, and the first chain teeth and the second chain teeth are staggered with each other, the slider selectively grips the second chain teeth and moves to engage or disengage the first chain teeth and the second chain teeth;

wherein the protector for the rear seat of the vehicle further comprises a connecting portion, one of an end of the left back pad adjacent to the first chain teeth and an end of the right back pad adjacent to the second chain teeth is connected to an end of the connecting portion, and the other one of the end of the left back pad adjacent to the first chain teeth and the end of the right back pad adjacent to the second chain teeth is detachably connected to another end of the connecting portion, and thereby the first chain teeth and the second chain teeth are covered for protection by the connecting portion.

2. The protector for the rear seat of the vehicle according to claim 1, wherein the cover portion is detachably connected to an edge of the first notch and an edge of the second notch through a hook and loop fastener structure.

3. The protector for the rear seat of the vehicle according to claim 2, wherein the hook and loop fastener structure comprises a loop surface disposed on an edge of the cover portion, a first hook surface disposed on the edge of the first notch, and a second hook surface disposed on the edge of the second notch; when the cover portion covers the receiving hole, the loop surface is bonded to the first hook surface and the second hook surface at the same time.

4. The protector for the rear seat of the vehicle according to claim 3, wherein the first hook surface extends from an edge of the first notch near the connection of the left back pad and the seat cushion to an edge of the first notch close to the first chain teeth, the second hook surface extends from an edge of the second notch near the connection of the right back pad and the seat cushion to an edge of the second notch close to the second chain teeth, the loop surface extends from an end of the cover portion adjacent to the left back pad along an outer edge of the cover portion to an end of the cover portion adjacent to the right back pad.

5. The protector for the rear seat of the vehicle according to claim 4, wherein an end of the first hook surface adjacent to the first chain teeth is horizontally disposed, and an end of the second hook surface adjacent to the second chain teeth is horizontally disposed, the loop surface is disposed at a horizontal line of an edge of the cover portion away from the back pad and the seat cushion, and the loop surface is detachably connected to the cover portion, when the loop surface and the cover portion are detached, the loop surface provided in the horizontal straight line is simultaneously bonded to the first hook surface and the second hook surface.

6. The protector for the rear seat of the vehicle according to claim 5, wherein the loop surface and the cover portion are connected to each other by a snap button, a button or a magnet.

7. The protector for the rear seat of the vehicle according to claim 1, wherein the cover portion is detachably connected to an edge of the first notch and an edge of the second notch by a snap, a button or a magnet.

8. A protector for a rear seat of a vehicle, comprising a seat cushion and a back pad connected to the seat cushion, wherein the back pad comprises a left back pad and a right back pad provided on a same edge of the seat cushion, the left back pad has a first side edge, and the right back pad has a second side edge adjacent to the first side edge;

wherein the first side edge at an end of the left back pad away from the seat cushion is provided with a first engaging portion, the first side edge at another end of the left back pad adjacent to the seat cushion is internally recessed in a direction facing away from the first engaging portion to form a first notch, and the first notch in a lengthwise direction of the first engaging portion extends from a connection between the left back pad and the seat cushion to the first engaging portion;

wherein the second side edge at an end of the right back pad away from the seat cushion is provided with a second engaging portion, and the second side edge at another end of the right back pad adjacent to the seat cushion is internally recessed in a direction facing away from the second engaging portion to form a second notch, and the second notch in the lengthwise direction of the first engaging portion extends from a connection between the right back pad and the seat cushion to the second engaging portion;

wherein the left back pad and the right back pad are detachably connected by the first engaging portion and the second engaging portion, the first notch and the second notch are communicated with each other to form a receiving hole when the first engaging portion and the second engaging portion are connected, the receiving hole is matched with a vertical cross section of an open state of a central armrest of the rear seat of the vehicle;

wherein the protector for the rear seat of the vehicle further comprises a cover portion disposed at a connection between the seat cushion and the back pad, and the cover portion can selectively open or cover the receiving hole;

wherein the protector for the rear seat of the vehicle further comprises a first tether and a second tether, the first tether is disposed at the end of the left back pad away from the seat cushion, and the second tether is disposed at the end of the right back pad away from the seat cushion;

wherein the first engaging portion comprises first chain teeth arranged on the left back pad and a slider clamped on the first chain teeth, the second engaging portion comprises second chain teeth arranged on the right back pad, and the first chain teeth and the second chain teeth are staggered with each other, the slider selectively grips the second chain teeth and moves to engage or disengage the first chain teeth and the second chain teeth;

wherein the protector for the rear seat of the vehicle further comprises a connecting portion, one of an end of the left back pad adjacent to the first chain teeth and an end of the right back pad adjacent to the second chain teeth is connected to an end of the connecting portion, and the other one of the end of the left back pad adjacent to the first chain teeth and the end of the right back pad adjacent to the second chain teeth is detachably connected to another end of the connecting portion, and thereby the first chain teeth and the second chain teeth are covered for protection by the connecting portion.

9. The protector for the rear seat of the vehicle according to claim 8, wherein the cover portion is detachably connected to an edge of the first notch and an edge of the second notch through a hook and loop fastener structure.

10. The protector for the rear seat of the vehicle according to claim 9, wherein the hook and loop fastener structure comprises a loop surface disposed on an edge of the cover portion, a first hook surface disposed on the edge of the first notch, and a second hook surface disposed on the edge of the second notch; when the cover portion covers the receiving hole, the loop surface is bonded to the first hook surface and the second hook surface at the same time.

11. The protector for the rear seat of the vehicle according to claim 10, wherein the first hook surface extends from an edge of the first notch near the connection of the left back pad and the seat cushion to an edge of the first notch close to the first chain teeth, the second hook surface extends from an edge of the second notch near the connection of the right back pad and the seat cushion to an edge of the second notch close to the second chain teeth, the loop surface extends from an end of the cover portion adjacent to the left back pad along an outer edge of the cover portion to an end of the cover portion adjacent to the right back pad.

12. The protector for the rear seat of the vehicle according to claim 11, wherein an end of the first hook surface adjacent to the first chain teeth is horizontally disposed, and an end of the second hook surface adjacent to the second chain teeth is horizontally disposed, the loop surface is disposed at a horizontal line of an edge of the cover portion away from the back pad and the seat cushion, and the loop surface is detachably connected to the cover portion, when the loop surface and the cover portion are detached, the loop surface provided in the horizontal straight line is simultaneously bonded to the first hook surface and the second hook surface.

13. The protector for the rear seat of the vehicle according to claim 12, wherein the loop surface and the cover portion are connected to each other by a snap button, a button or a magnet.

14. The protector for the rear seat of the vehicle according to claim 8, wherein the cover portion is detachably connected to an edge of the first notch and an edge of the second notch by a snap, a button or a magnet.

\* \* \* \* \*